United States Patent [19]
Davin

[11] 3,859,732
[45] Jan. 14, 1975

[54] PRECEDING MOTOR VEHICLE OBSERVATION SPACING GUIDE

[76] Inventor: John Joseph Davin, R.D. 2, Box 214, Troy, N.Y. 12182

[22] Filed: Feb. 29, 1972

[21] Appl. No.: 230,384

[52] U.S. Cl................................. 33/264, 33/277
[51] Int. Cl............................................. G01c 21/00
[58] Field of Search............ 33/264, 227, 228, 279, 33/280, 284

[56] References Cited
UNITED STATES PATENTS

| | | | |
|---|---|---|---|
| 2,091,028 | 8/1937 | Darling | 33/264 |
| 2,360,368 | 10/1944 | Rubissow | 33/264 |
| 3,434,214 | 3/1969 | Pratt | 33/264 |
| 3,722,795 | 11/1973 | Calvet | 33/264 |

Primary Examiner—Richard E. Aegerter
Assistant Examiner—Willis Little
Attorney, Agent, or Firm—Matthew M. Russo; Ernest F. Weinberger

[57] ABSTRACT

A device by which an operator of a motor vehicle can readily ascertain the distance between his vehicle and a forward or preceding vehicle. A pair of spaced apart channel guides are affixed to the windshield of the vehicle in the line of the operator's sight. Carried for lengthwise sliding movement within said channels is a transparent slide member that has scribed thereon a plurality of spaced horizontal indexed lines and a lower reference mark. The guide is initially calibrated by the operator merely by adjusting the slide vertically (detents) so that in his line of sight the reference mark is aligned with the top edge of his hood or with an ornament carried by his car or with an external guide. Thereafter all vehicle spacing can be determined by the operator simply by viewing either the tail lights or license plate lights of the preceding automobile and observing the relative horizontal position thereof in reference to the index lines.

7 Claims, 4 Drawing Figures

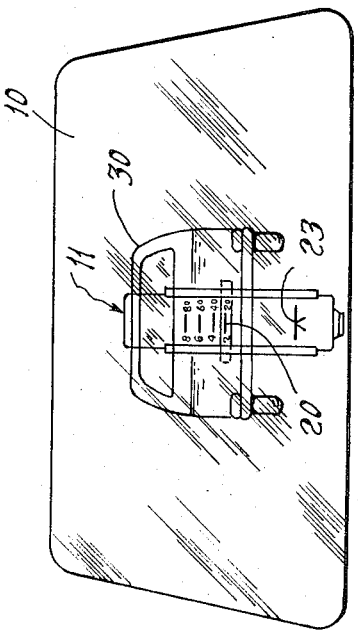
Fig. 4
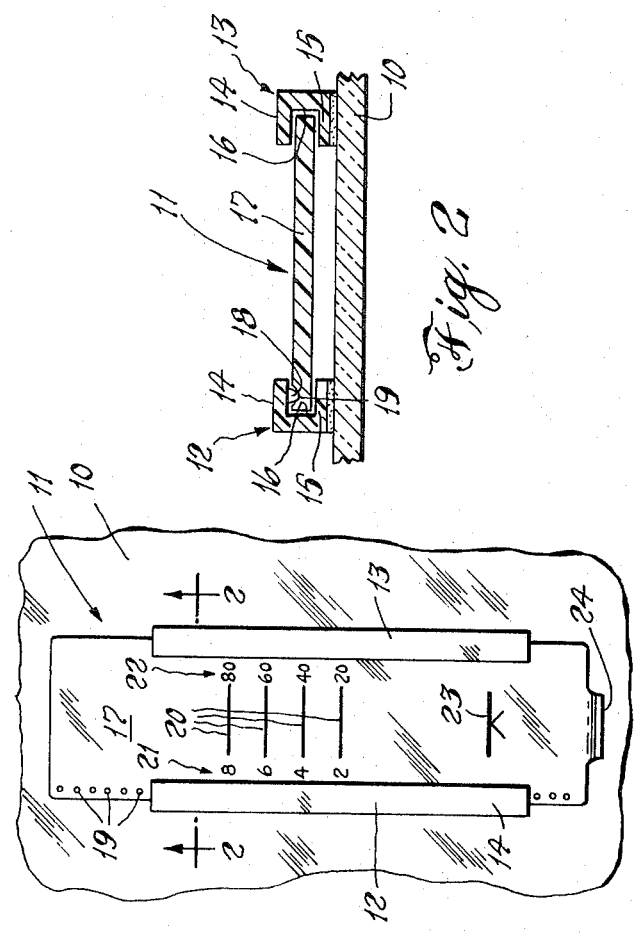
Fig. 2
Fig. 1
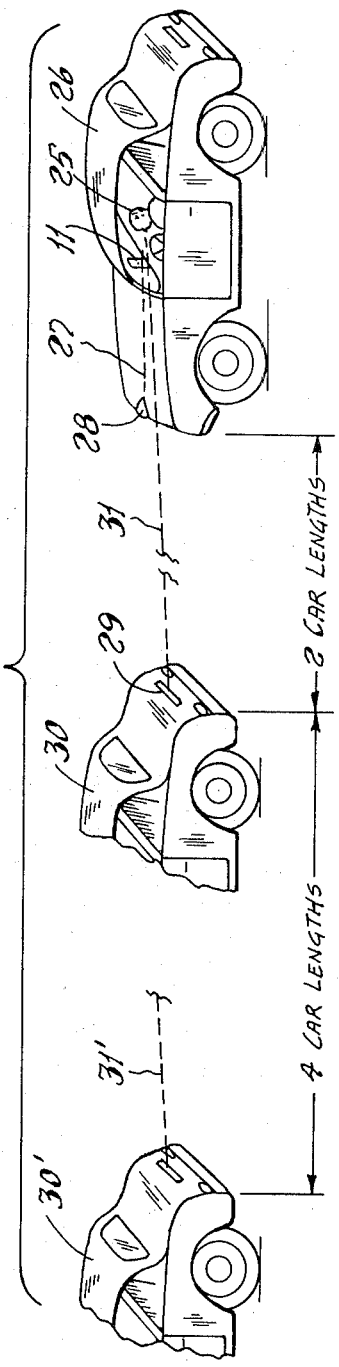
Fig. 3

PRECEDING MOTOR VEHICLE OBSERVATION SPACING GUIDE

BACKGROUND OF THE INVENTION

The present invention relates to distance determining means and more particularly pertains to readily ascertaining the proximate distance of a preceding vehicle by a simple direct device in conjunction with a visual sighting.

In the field of motor vehicle separation determining means it has been the general practice to employ electronic devices to perform these functions. Such devices have been unsatisfactory in that they are expensive, complex, not entirely reliable and in general single sensing means which only operate under one set of conditions. These proposed systems can employ various types of proximity sensing parameters as for example, those dependent on reflected light or laser beans, sonic signals, heat and r.f. signals. In those devices using sonic, heat or light beams the intervening environmental conditions introduce parameters which are not easily accounted for. These include fog, atmospheric conditions, wind velocity, temperature, reflectivity changes and barometric values. Primarily, such devices have not been perfected to the point of practical application and in certain aspects are only effective during daylight or night hours. Thus, in view of the complexity, unreliability and restricted use of these devices, they have been employed solely in a limited experimental sense.

SUMMARY OF THE INVENTION

The general purpose of this invention is to provide a distance determining means for motor vehicles that has all the advantages of similarly employed prior art devices and has none of the above described disadvantages. To attain this, the present invention provides a carrier which may be affixed to the windshield and supports for vertical movement, a transparent guide member. The guide member has scribed thereon a plurality of spaced horizontal lines and a lowermost reference mark. The carrier may be in the form of a pair of spaced apart channels in which the guide rides and can be releaseably held by the interaction of detents formed in the walls of the channels abutting the guide and coacting with depressions therein. Means such as a tab are provided for manually adjusting the slide in order to properly calibrate the same.

In view of the foregoing it is an object of this invention to provide a simple, inexpensive, reliable, and a safe device for easily determining the separation of a first vehicle from a preceding vehicle.

Another object is to provide a device by which an operator can ascertain whether his vehicle is separated from a preceding vehicle by a safe distance for his speed of travel and to prevent inadvertant tailgating.

Other objects and many of the attendant advantages of this invention will be readily appreciated as the same becomes better understood by reference to the following detailed description when considered in connection with the accompanying drawings, in which like reference numerals designate like parts throughout the figures thereof.

BRIEF DESCRIPTION OF THE DRAWINGS

FIG. 1 is a plan view of an embodiment made in accordance with the principle of this invention and illustrates the relative positioning of the parts thereof;

FIG. 2 is a cross-sectional view taken approximately along line 2—2 of FIG. 1;

FIG. 3 is a perspective view of the relative positions of several motor vehicles illustrating the operation and principle of the invention; and, FIG. 4 illustrates the embodiment as applied to a windshield and the view as seen by the operator of such motor vehicle.

DESCRIPTION OF THE PREFERRED EMBODIMENT

In the illustrated embodiment of FIGS. 1 and 2, the windshield 10 of an automobile has affixed thereto the spacing determining device 11. The device, as shown, includes a pair of spaced apart channel guides 12 and 13 which are essentially "C" shaped in cross-sectional to provide between the rear wall 14 and the forward wall 15 of each, a channel or recess 16. The channels may be joined by cross pieces so as to properly space them or they may be spaced by use of the slide member 17 which is disposed therebetween for vertical or longitudinal movement. The slide member 17 is of a transparent material which can, suitably be any of a variety of plastics as can all the other component elements of the device. Means are provided for releasably holding the slide in one or both of the channel guides. Many such means are available, one being a detent arrangement which consists of one or more spaced projections 18 formed in the inner wall of the channel guide so as to coact with an aligned plurality of depressions 19 linearly arranged along the edge of and formed in the slide member. This arrangement or structure can be provided for both channels and on either or both forward and back walls. If desired, it should be noted that only one channel can be used as the carrier means, and this means can be readily secured to the windshield by a layer of any suitable material such as mastic, adhesive or epoxy resin provided only that it be transparent so as not to interfere or obstruct the operator's vision. In this regard it should be observed that the placement of the device on the inner face of the windshield should be such that it may be easily sighted through but not so as to impede the operation of the vehicle by the operator. The slide is provided with a plurality of opaque horizontal index lines 20 which may be etched or scribed thereon by any number of available means. Each index 20 line has associated therewith on one side numerical indicia 21 of the separation in car lengths and on the other 22 the maximum safe speed for that separation. The values are set for each differently structured vehicle as are the spacings between the index lines. A reference or calibration line 23 is disposed at the lower portion of the slide 17 which is further provided with a tab or handle 24 for manual movement thereof by the operator.

Referring now also to FIG. 3, the device 11 is initially calibrated and aligned with the operator 25 normally seated in his driving position and the device affixed to the windshield of his vehicle 26 directly in front of him. The operator adjusts the slide 17 by raising or lowering it until in his line of sight 27, the reference line 23 is aligned with the top of the hood or with a corresponding guide 28 disposed thereon. This latter guide may be the automobile hood ornament or it can be a simple protrusion affixed to the hood for this purpose. From this point on the driver merely sights through the device at the license or license light 29 or any other suitable structural feature of the preceding car 30 along the line of sight 31 and views the intersection of the license and the scribed indicia on the device to ascertain the separation. This is fully shown in FIG. 4, as viewed by the operator, wherein the license intersects the mark at the two car separation. On the right of this line there is indicated the relative approved safe speed for this vehicle separation. In other words, at say 20 miles per hour the preceding vehicle should be at least two car lengths ahead. The operator during use merely sights through the device, determines the vehicle separation or the relative safe speed, then observes his own speed and mental comparison permits him to ascertain whether he is too close to the preceding vehicle and thereby creating an unsafe traffic condition generally referred to as "tailgating." There is also illustrated a second car 30' which is sighted via line 31' and indicates a separation total of six car lengths thus permitting a safe speed of approximately 60 miles per hour.

It should be understood, of course, that the foregoing disclosure relates to only a preferred embodiment of the invention and that numerous modifications or alterations may be made therein without departing from the spirit and the scope of the invention as set forth in the appended claims.

I claim:

1. In a motor vehicle, an improvement in an apparatus for ascertaining the separation distance of a preceeding vehicle therefrom, of which comprises:
   slide support carrier means (carrying for releasable movement) including a pair of spaced apart longitudinal channel members each having an aligned recess for slidably receiving therebetween,
   a slide member of transparent material having scribed thereon a plurality of spaced apart horizontal lines, and a lowermost reference mark,
   means provided on said support means for fixedly holding said slide member in said channel members at selectable positions, and
   means for fixedly serving said support means to the windshield of said motor vehicle in the line of sight of the operator, and the slide being selectively positioned in said support means in said line of sight which includes in alignment, said reference mark and the top of the hood of said motor vehicle, whereby the operator may ascertain the separation of his vehicle from said preceding vehicle by observing between which of said horizontal lines a structural portion of said proceding vehicle appears.

2. The apparatus, according to claim 1, wherein said means for holding is a detent arrangement which includes a plurality of protrusions in one of the walls forming said recess and aligned coacting depressions in said slide member.

3. The apparatus, according to claim 2, further including means for imparting manual movement to said slide member by said operator.

4. The apparatus, according to claim 3, wherein said means for imparting movement is a tab extension carried by said slide member.

5. The apparatus, according to claim 4, further including means for affixing said channels to said windshield.

6. The apparatus, according to claim 5, wherein said means for affixing includes an adhesive layer intermediate one wall of said channels and said windshield.

7. The apparatus, according to claim 6, further including an external reference guide affixed to the hood of said motor vehicle.

* * * * *